United States Patent [19]

Fieschi et al.

[11] Patent Number: 4,953,180
[45] Date of Patent: Aug. 28, 1990

[54] BIT RATE ADAPTATION SYSTEM FOR DIGITAL TRANSMISSION SYSTEMS

[75] Inventors: Jacques Fieschi; Michel Glisse, both of Saint Laurent du Var; Jean-Francois Le Pennec, Nice, all of France

[73] Assignee: International Business Machines Corporation, Armonk, N.Y.

[21] Appl. No.: 341,392

[22] Filed: Apr. 21, 1989

[30] Foreign Application Priority Data

Apr. 29, 1988 [EP] European Pat. Off. ........ 88480013.7

[51] Int. Cl.$^5$ .............................................. H04J 3/22
[52] U.S. Cl. .......................................... 375/7; 370/84; 375/8
[58] Field of Search ....................... 375/8, 7, 106, 122; 370/79, 84, 100, 118; 379/93, 97, 98

[56] References Cited

U.S. PATENT DOCUMENTS 4,691,342  9/1987  Waldron ................................ 379/98
4,823,312  4/1989  Michael et al. ....................... 370/84

FOREIGN PATENT DOCUMENTS 0068595  5/1983  European Pat. Off. .
0210798  4/1987  European Pat. Off. .

OTHER PUBLICATIONS

Data Communications, vol. 12, No. 6, Jun. 1983, pp. 125–136 "Looking at ISDN Interfaces" Collie et al.
Electronics, vol. 51, No. 4, Feb. 1978, pp. 110–113 "EPROM Achieves Non-Uniform Data-Channel Sampling" Bowles, B. et al.
Patent Abstracts of Japan, vol. 7, No. 84 (E-169) (12297, 8th) Apr. 1983.
Patent Abstracts of Japan JP-A-58945 (Sumitomo Jukikai Kogyo K. K.) Jan. 1, 1983.

Primary Examiner—Benedict V. Safourek
Attorney, Agent, or Firm—Joscelyn G. Cockburn

[57] ABSTRACT

A rate adaptation system for adapting the rate of a communication stream between a first communication device (TE) and a second communication device (NT). The first communication device transmits and receives data at a first given rate and the second communication device transmits and receives data at a second rate higher than said first rate (generally 8, 16, 32 or 64 kbits/s). The rate adaptation system includes a transmit part (620) which allows the transmission from the first communication device to the second communication device by means of a bit repetition and framing function. The rate adaptation system also includes a receive part (630) which allows the transmission from the second communication device to the first communication device. The invention further includes a first storage (670) which can be addressed by an address bus (640), a data bus (650) and a control bus (660) either by the transmit part (620), or the receive part (630) or by a processor (680) external to the transmit and receive part. A second storage (690) can be addressed by the processor (680).

8 Claims, 11 Drawing Sheets

FIG. 3

| OCTET NUMBER | BIT NUMBER | | | | | | | |
|---|---|---|---|---|---|---|---|---|
| | ONE | TWO | THREE | FOUR | FIVE | SIX | SEVEN | EIGHT |
| ZERO | 0 | 0 | 0 | 0 | 0 | 0 | 0 | 0 |
| ONE | 1 | D1 | D2 | D3 | D4 | D5 | D6 | S1 |
| TWO | 1 | D7 | D8 | D9 | D10 | D11 | D12 | X |
| THREE | 1 | D13 | D14 | D15 | D16 | D17 | D18 | S3 |
| FOUR | 1 | D19 | D20 | D21 | D22 | D23 | D24 | S4 |
| FIVE | 1 | E1 | E2 | E3 | E4 | E5 | E6 | E7 |
| SIX | 1 | D25 | D26 | D27 | D28 | D29 | D30 | S6 |
| SEVEN | 1 | D31 | D32 | D33 | D34 | D35 | D36 | X |
| EIGHT | 1 | D37 | D38 | D39 | D40 | D41 | D42 | S8 |
| NINE | 1 | D43 | D44 | D45 | D46 | D47 | D48 | S9 |

| 0 | 0 | 0 | 0 | 0 | 0 | 0 |
|---|---|---|---|---|---|---|
| 1 | D1 | D1 | D1 | D1 | D1 | S1 |
| 1 | D1 | D1 | D2 | D2 | D2 | X |
| 1 | D2 | D2 | D2 | D2 | D3 | S3 |
| 1 | D3 | D3 | D3 | D3 | D3 | S4 |
| 1 | 1 | 0 | 0 | E4 | E5 | M |
| 1 | D4 | D4 | D4 | D4 | D4 | S6 |
| 1 | D4 | D4 | D5 | D5 | D5 | X |
| 1 | D5 | D5 | D5 | D5 | D6 | S8 |
| 1 | D6 | D6 | D6 | D6 | D6 | S9 |

FIG. 5B

| 0 | 0 | 0 | 0 | 0 | 0 | 0 | 0 |
|---|---|---|---|---|---|---|---|
| 1 | D1 | D1 | D1 | D1 | D2 | D2 | S1 |
| 1 | D2 | D2 | D3 | D3 | D3 | D3 | X |
| 1 | D4 | D4 | D4 | D4 | D5 | D5 | S3 |
| 1 | D5 | D5 | D6 | D6 | D6 | D6 | S4 |
| 1 | 0 | 1 | 0 | E4 | E5 | E6 | 1 |
| 1 | D7 | D7 | D7 | D7 | D8 | D8 | S6 |
| 1 | D8 | D8 | D9 | D9 | D9 | D9 | X |
| 1 | D10 | D10 | D10 | D10 | D11 | D11 | S8 |
| 1 | D11 | D11 | D12 | D12 | D12 | D12 | S9 |

FIG. 5C

| 0 | 0 | 0 | 0 | 0 | 0 | 0 | 0 |
|---|---|---|---|---|---|---|---|
| 1 | D1 | D1 | D2 | D2 | D3 | D3 | S1 |
| 1 | D4 | D4 | D5 | D5 | D6 | D6 | X |
| 1 | D7 | D7 | D8 | D8 | D9 | D9 | S3 |
| 1 | D10 | D10 | D11 | D11 | D12 | D12 | S4 |
| 1 | 1 | 1 | 0 | E4 | E5 | E6 | 1 |
| 1 | D13 | D13 | D14 | D14 | D15 | D15 | S6 |
| 1 | D16 | D16 | D17 | D17 | D18 | D18 | X |
| 1 | D19 | D19 | D20 | D20 | D21 | D21 | S8 |
| 1 | D22 | D22 | D23 | D23 | D24 | D24 | S9 |

FIG. 5D

| 0 | 0   | 0   | 0   | 0   | 0   | 0   | 0  |
|---|-----|-----|-----|-----|-----|-----|----|
| 1 | D1  | D2  | D3  | D4  | D5  | D6  | S1 |
| 1 | D7  | D8  | D9  | D10 | F   | F   | X  |
| 1 | D11 | D12 | F   | F   | D13 | D14 | S3 |
| 1 | F   | F   | D15 | D16 | D17 | D18 | S4 |
| 1 | 1   | 0   | 1   | E4  | E5  | E6  | 1  |
| 1 | D19 | D20 | D21 | D22 | D23 | D24 | S6 |
| 1 | D25 | D26 | D27 | D28 | F   | F   | X  |
| 1 | D29 | D30 | F   | F   | D31 | D32 | S8 |
| 1 | F   | F   | D33 | D34 | D35 | D36 | S9 |

FIG. 5E

| 0 | D1  | D2  | D3  | D4  | D5  | D6  | S1 |
|---|-----|-----|-----|-----|-----|-----|----|
| 1 | D7  | D8  | D9  | D10 | D11 | D12 | X  |
| 1 | D13 | D14 | D15 | D16 | D17 | D18 | S3 |
| 1 | D19 | D20 | D21 | D22 | D23 | D24 | S4 |
| 1 | 0   | 1   | 1   | E4  | E5  | E6  | 1  |
| 1 | D25 | D26 | D27 | D28 | D29 | D30 | S6 |
| 1 | D31 | D32 | D33 | D34 | D35 | D36 | X  |
| 1 | D37 | D38 | D39 | D40 | D41 | D42 | S8 |
| 1 | D43 | D44 | D45 | D46 | D47 | D48 | S9 |
| 1 |     |     |     |     |     |     |    |

| OCTET NUMBER | BIT NUMBER | | | | | | |
|---|---|---|---|---|---|---|---|
| | 1 | 2 | 3 | 4 | 5 | 6 | 7 | 8 |
| 1 | 1 | D1 | D2 | D3 | D4 | D5 | D6 | S1 |
| 2 | 0 | D7 | D8 | D9 | D10 | D11 | D12 | X |
| 3 | 1 | D13 | D14 | D15 | D16 | D17 | D18 | S3 |
| 4 | 1 | D19 | D20 | D21 | D22 | D23 | D24 | S4 |

FIG.5F

| OCTET NUMBER | BIT NUMBER | | | | | | |
|---|---|---|---|---|---|---|---|
| | 1 | 2 | 3 | 4 | 5 | 6 | 7 | 8 |
| 1 | D1 | D2 | D3 | D4 | D5 | D6 | D7 | 1 |
| 2 | D8 | D9 | D10 | D11 | D12 | D13 | D14 | 1 |
| 3 | D15 | D16 | D17 | D18 | D19 | D20 | D21 | 1 |
| 4 | D22 | D23 | D24 | D25 | D26 | D27 | D28 | 1 |
| 5 | D29 | D30 | D31 | D32 | D33 | D34 | D35 | 1 |
| 6 | D36 | D37 | D38 | D39 | D40 | D41 | D42 | 1 |
| 7 | D43 | D44 | D45 | D46 | D47 | D48 | D49 | 1 |
| 8 | D50 | D51 | D52 | D53 | D54 | D55 | D56 | 1 |

FIG.5G

BIT RATE ADAPTATION SYSTEM FOR DIGITAL TRANSMISSION SYSTEMS

TECHNICAL FIELD OF THE INVENTION

The present invention relates to data transmission systems and more particularly to a bit rate adapter for digital networks.

BACKGROUND ART

The concept of digital networks such as Integrated Service Digital Network (I.S.D.N.), began in the early sixties, with the process of digitalization of telephone networks in different countries, thus replacing the earlier analog technologies.

The concept of I.S.D.N. involving fully digital connections between data communication equipments, still far from complete, is expected to offer substantial advantages such as an economy of network costs, an economy in the use of the equipment, a flexibility of planning, less risk generated by the uncertainty of the demand for new services, uniform procedures for access to networks and relative simplification for users, considerable improvement in quality.

I.S.D.N. standards defined and studied by CCITT recommendations provide principles and guidelines on the I.S.D.N. concept, and detailed specifications of the user-network and internetwork interfaces.

FIG. 1 illustrates a simplified CCITT architectural reference model which is essential to the understanding of the structure of the physical reference points for the different I.S.D.N. interfaces (R, S, T, U and V).

This model provides that the equipments available to the users, namely TE1 and TE2, are connected to functional units, such as NT2 itself connected to functional unit NT1, via, when necessary, a terminal adapter (TA). Multiplexing operations as well as the level adaptation of the signal existing on the lines to the network on one hand, and signalling and maintenance operations on the other hand, are performed in functional units NT1/NT2.

Network Termination equipment NT2 allows the connection of data termination equipments and may also provide services to the subscriber without involving the network. This may be the case when using private switching systems of the PABX type, or a local LAN network. However, Network Terminating equipment NT2 can also be reduced to a "passive bus", i.e. a parallel connection on a cable, the subscriber line terminal (NT1 and NT2) being thus called "transparent".

Network Termination equipment NT1 performs the ISO layer 1 conversion from a two wire U interface, active on the line between the local exchange and the subscriber, and a two wire T interface. Basically, Network Termination equipment NT1 provides baseband conversion functions and network termination functions such as power supply, maintenance. . . .

Interfaces S and T of Network Termination equipments NT1 and NT2, described in CCITT I.430 recommendations, are the basic interfaces of any equipments designed to be connected to the I.S.D.N. The S interface provides a universal terminal interface, for the telephony as will for teleinformatics; it is most likely to supersede all specific data communication existing interfaces such as V24 (for the Data Terminating equipment of the future called TE1), at the end of a long process of transition during which Terminal Adapters TA are needed in order to connect an existing data termination equipment TE2 to I.S.D.N. (i.e. synchronous and asynchronous V.series, X21 and X21bis, X25 . . . ). The T interface materializes the only access to the network. Different standards have been defined, which correspond to different equipment sizes. R interface reference point is used to connect existing terminal equipment (X.21, V.24/V28. etc.) which are pre-I.S.D.N. terminals, to an I.S.D.N. network via a terminal adapter TA. U interface will be available for attachment in USA. V interface is the I.S.D.N. internal network interface header for the user.

Recommendation I.430 defines layer characteristics of the user-network interface to be applied at the S or T reference points for the basic interface structure. I.S.D.N. basic access provides a 144 kb/s transmission channel which is divided in three subchannels by means of a Time Division Multiplex mechanism: two B channels and a single D channel. Each of the B-channels is a 64 kbit/s duplex bearer channel with bit and octet timing which can be used for a digital telephone communication (the Pulse Code Modulation PCM is performed in the subscriber equipment) or for a 64 kbit/s data communication. The D-channel is a 16 kbit/s channel allowing dynamic multiplexing of the following information: signalling information relative to the B-channels, information relative to low rate teleservices, and information using low rate Packet Switching services (till 9 600 bit/s and even 16 kbit/s).

As seen previously, the connection of an existing terminal equipment TE2, of the type of the V. or X. type in the Recommendations will need a terminal adapter TA.

This Terminal Adapter TA should support various asynchronous and synchronous user data rates including at least the recommended basic set of speeds. To achieve this goal, Terminal Adapter TA must be able to perform multiplexing, rate adaptation and support of existing interfaces. According to CCITT I.460 Recommendation, Terminal Adapter should be able to adapt the rate of one stream, having a rate lower than 64 kbit/s, into a 64 kbit/s B-channel and to multiplex several streams, having rates lower than 64 kbit/s, into a single 64 kbit/s channel. The rates lower than 64 kbit/s may be of two types: binary rates of 8, 16 and 32 kbit/s and other rates including those associated with Data Terminating Equipment DTE conforming to the X and V Recommendations. Therefore, a rate adaptation system allowing the conversion of bit rates and facilitating the multiplexing of different streams into a B or D channel is needed. Since the concept of I.S.D.N. will provide in every customer's home the possibility of connection to the future digital network and thus will allow the customer to access large public telecommunications services, telecommunication product suppliers will have to market in large quantities terminal adapters TA designed to allow the connection of a wide range of existing data terminal equipments TE2 having different interfaces according to the V. or X. Recommendations. Terminal Adapter TA should use a simple and low cost rate adaptation system allowing the conversion of a stream having different possible rates lower than 64 kbit/s into a 64 kbit/s stream. More particularly, this rate adaptation device should involve few components in order to limit the manufacturing costs while assuring an adaptability of the terminal adapter to a large number of different existing Data Terminating Equipment DTE having different interfaces of the V. or the X. Recommendations. Moreover, the latter rate adaptation system should facilitate the further multiplexing of different streams in order to achieve a good utilization of the bandwidth provided by a B or D channel.

SUMMARY OF THE INVENTION

It is an object of the invention to provide a simple rate adaptation system for adapting the rate of one data communication stream, having a rate lower than 64 kbit/s, into a 64 kbit/s channel and to multiplex several streams, having rates lower than 64 kbit/s, into a single 64 kbit/s channel. It is an other object of the invention to provide a rate adaptation device for allowing the connection of a wide range of existing data terminal equipments having different interfaces according to the V. or X. CCITT Recommendations (I.460, I.461, I.463).

It is a further object of the invention to provide a rate adaptation system for primary rate user network interfaces (cf. Rec. I.431), or for a TE1 data terminal equipment.

The objects of the invention are achieved by means of the rate adaptation system of the invention which adapts the rate of a communication stream between a first communication device (TE) and a second communication device (NT). The first communication device transmits and receives data at a first given rate and the second communication device transmits and receives data at a second rate higher than said first rate (generally 8, 16, 32 or 64 kbits/s). The rate adaptation system includes a transmit part which allows the transmission from the first communication device to the second communication device by means of a bit repetition and framing function. The rate adaptation system also includes a receive part which allows the transmission from the second communication device to the first communication device. The invention further includes a first storage which can be addressed by an address bus, a data bus and a control bus either by the transmit part, or the receive part or by a processor external to the transmit and receive part. A second storage can be addressed by the processor. A part of its content, representative of a particular frame structure corresponding to a given bit repetition and frame function, is loaded into the first storage during an initialization period. The transmit part includes means operating after the initialization period, which generates a sequence of values on the address bus. In this way, a sequence of data words is extracted from the first storage and is used to control the transmit part. Similarly, the receive part includes means for generating a second sequence of values on the data bus at different instants from the transmit part, thus providing a second sequence of data words which are extracted from the first storage and used to control the receive part.

The sharing of the first storage may thus decrease the final number of electronic components, assure that both transmission and receive part are controlled by the same sequence of data words, and provide a rate adaptation system capable of operating at high speeds.

DESCRIPTION OF THE DRAWINGS

FIG. 3 is a view of frame format involved into the Intermediate Rate Adaptation function RA1 of a rate adaptation device.

FIG. 5a, 5b and 5c respectively shows the adaptation of the 600, 1200 and 2400 bit/s rates to the 8 kbit/s rate including user bit repetition.

FIG. 5d. shows the adaptation of 7200 and 14400 bit/s rates to the 16 and 32

FIG. 5e describes the adaptation of 4800, 9600 and 19200 bit/s rates to the 8, 16 and 32 kbit/s intermediate rates respectively.

FIG. 5f and 5g describes the rate adaptation of 48 and 56 kbit/s to the B-channel rate in one step.

DESCRIPTION OF THE INVENTION

Figure 1:
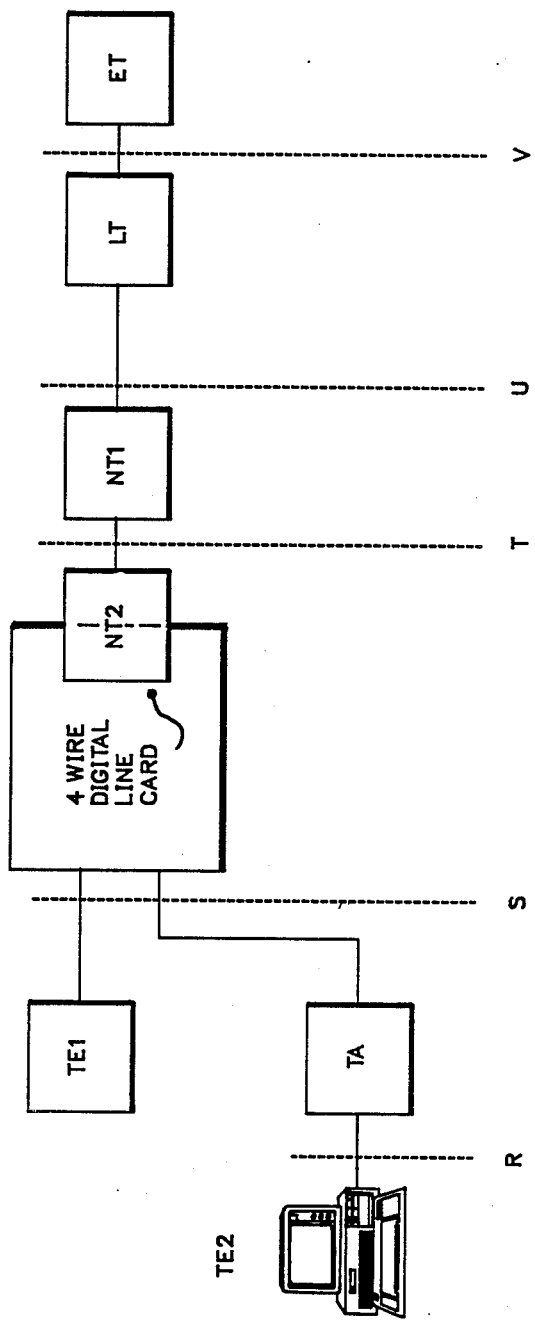
FIG. 1 illustrates a simplified CCITT architectural reference model for the I.S.D.N. interfaces (R, S and T) and functional groupings as T1, T2, NT1 and NT2.
Figure 2:
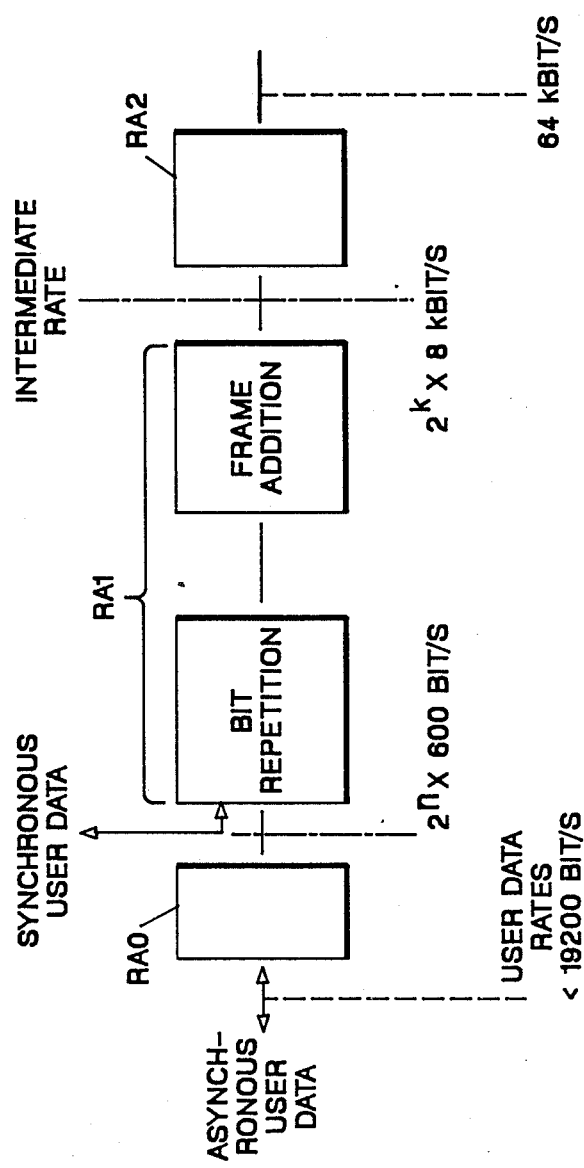
FIG. 2 describes the general architecture of a rate adaptation system and the main functions involved.

FIG. 2 shows the general functions in a Terminal Adapter in order to perform the needed bit rate adaptation functions. Three distinctive steps are involved in this process by means of three different functional blocks RA0, RA1 and RA2.

Function RA0 achieves the Packet Assembler Disassembler PAD function. It consists in an asynchronous-to-synchronous conversion-stage, using a technique defined in CCITT Recommendations V.22 for the support of the basic signalling rate range, and is not used on synchronous user data. This function is not part of the invention but is mentioned in order to assure a better understanding of the hereinafter description. Basically, incoming asynchronous data is padded by the addition of stop elements to fit the nearest channel defined by 2n times 600 bit/s (where n=0 to 5). Thus a 300 bit/s user data signalling rate shall be adapted to a synchronous 600 bit/s stream, and a 3600 bit/s user data signalling rate to 4800 bit/s synchronous. The resultant synchronous stream is fed to function RA1.

Function RA1 converts the user data signalling rate or stream from RA0 block to an appropriate intermediate rate defined by 2 k times 8 kbit/s (where k=0, 1 or 2). RA1 function can take either the output of the above RA0 or the output of a synchronous V.- and X.- Series interfaces, and performs a bit repetition and framing function to fill an intermediate data channel of 8, 16 or 32 kbit/s. A user bit repetition factor of 1, 2, 4 or 8 will be used as appropriate to adapt the rate to an intermediate data channel. The framing function is achieved by means of a 80-bit frame as will be described below with respect to FIG. 3.

Functional block RA2 performs the final conversion from the intermediate rates generated by functional block RA1 to 64 kbit/s. Synchronous data signalling rates of 48 kbit/s and 56 kbit/s are converted directly into the 64 kbit/s channel rate. Since the rate adaptation of the single intermediate rate of 8, 16 or 32 kbit/s generated by functional block RA1, to the 64 kbit/s B-channel rate must be compatible to enable interworking, functional block RA2 uses a common approach for the second step rate adaptation, and for the intermediate rate multiplexing.

FIG. 3 summarizes the 80-bit frame used to perform the framing function according to ECMA-102 Recommendations (European adaptation of CCITT Recommendations I.463). The octet zero contains eight zeros, whilst octet five consists of a ONE followed by seven E-bits, the latter E-bits being used to carry in. formation relative to bit repetition identification (E1, E2 and E3) and also network independent clock information (E4, E5 and E6) and multi-frame synchronization (E7). In octets one to four, and six to nine, bit one is set to ONE, bit eight is a status bit (S or X) and bits two to seven are databits (D). The order of transmission is from left to right and top to bottom. The 17-bit frame alignment pattern consisting of all eight bits of octet zero (set to ZERO), and all bits in position one (set to ONE) of the nine octets are called the Frame synchronization bits. In contrary with D-bits conveying user data information, S and X bits allow the conveying of channel control information.

Figures 4, 4A:
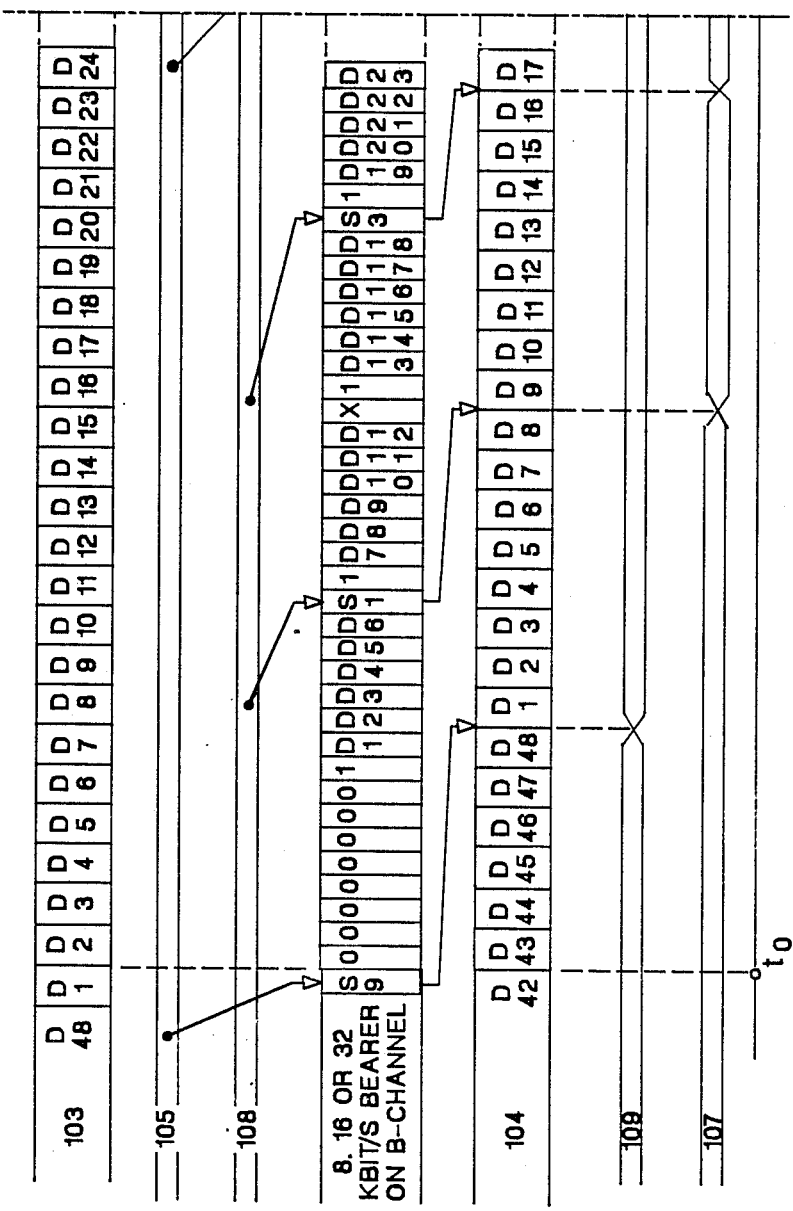
FIGS. 4, 4a and 4b are timings illustrating the order of transmission of data information D bits and control information bits according to signals on interchange circuits according to CCITT Rec. V24.
Figure 4B:
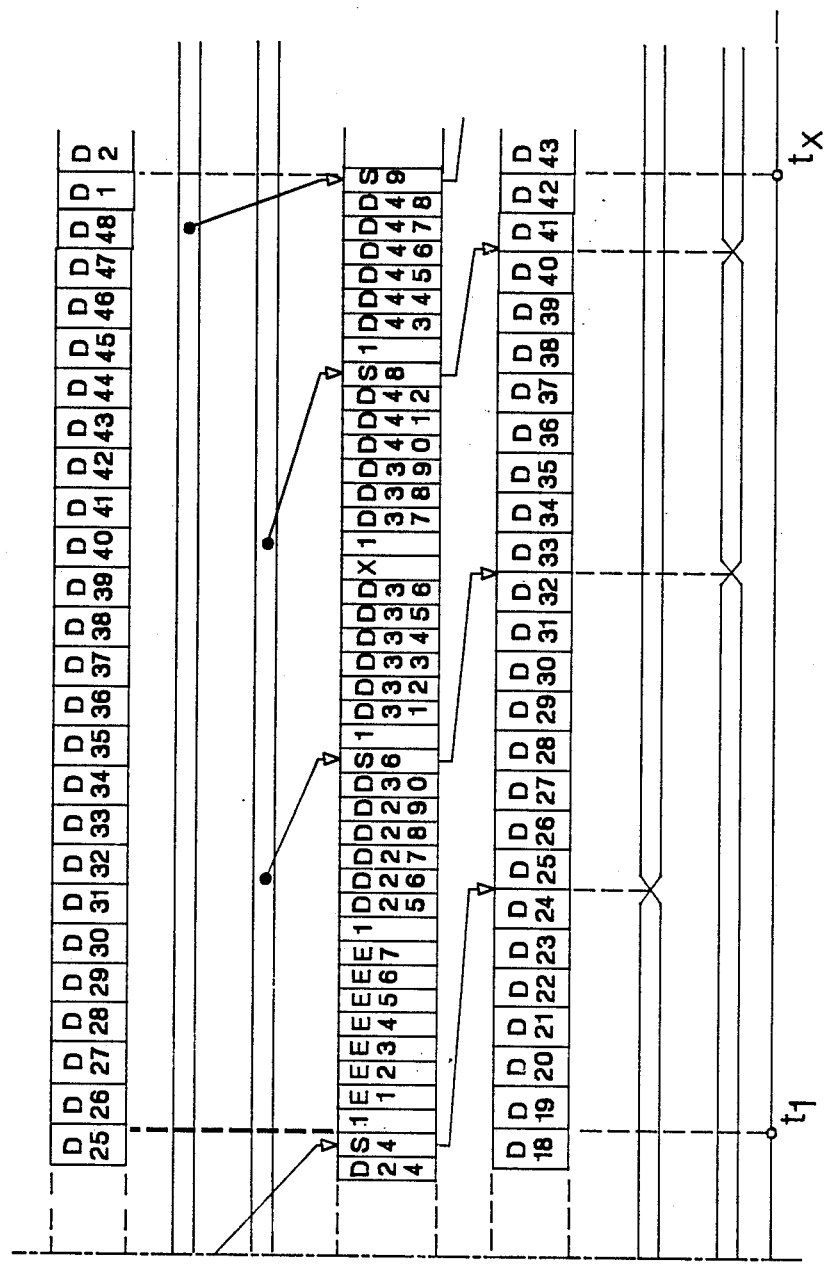

FIG. 4 are examples of timings illustrating the transmission of each bit of the 80-bit frame described with respect to FIG. 3. The figure particularly illustrates the case of an interface of the type V.24. The timings referenced 103, 105, 108, 104, 109 and 107 respectively corresponds with the timings of the signals conveyed by interchange circuits as defined in CCITT Rec. V24:

circuit 103: "transmitted data"
circuit 104: "received data"
circuit 105: "request to send"
circuit 107: "data set ready"
circuit 108: "connect data set to line" or "data terminal ready"
circuit 109: "data channel received line signal detector"

Circuit 103 carries the stream of data bits which will be conveyed in Data bits, i.e. up to 48 such bits per 80-bit frame of the FIG. 3. In particular, functional block RA1 (FIG. 2) multiplexes the data coming from "Transmitted data" circuit 103, with data carried on "Request to send" circuit 105 and circuit 108 to form a single intermediate data channel stream of 8, 16 or 32 kbit/s. The X bit is used to carry the condition of circuit 106 of CCITT Rec. V24 and not shown in the figure, and in addition, signals the state of frame synchronization between Terminal Adapters TA.

In order to achieve the adaptation of the 600, 1200, 2400, 7200, 9600, 14,400, 19,200 bit/s rates to the intermediate rate, the above frame function of block RA1 will have to follow a bit repetition function. FIGS. 5a, 5b, 5c, 5d and 5e describe the adaptation of those rates. FIG. 5a, 5b and 5c respectively show the adaptation of the 600, 1200 and 2400 bit/s rates to the 8 kbit/s rate including user bit repetition. The adaptation of 7200 and 14,400 bit/s rates to the 16 and 32 kbit/s intermediate rates respectively, use the data bit assignments shown in FIG. 5d. The adaptation of 4800, 9600 and 19,200 bit/s rates to the 8, 16 and 32 kbit/s intermediate rates respectively, use the data bit assignment shown in FIG. 5e.

As seen previously, all rates below 48 kbit/s are adapted to a single intermediate rate (e.g. 8, 16 or 32 kbit/s), which is then adapted by means of functional block RA2 to the 64 kbit/s B-channel rate. However, 48 kbit/s and 56 kbit/s communication streams are directly adapted in one step to the 64 kbit/s B-channel as indicated in FIGS. 5e and 5f, and therefore do not involve a similar frame structure as that of FIG. 3.

Figure 6:
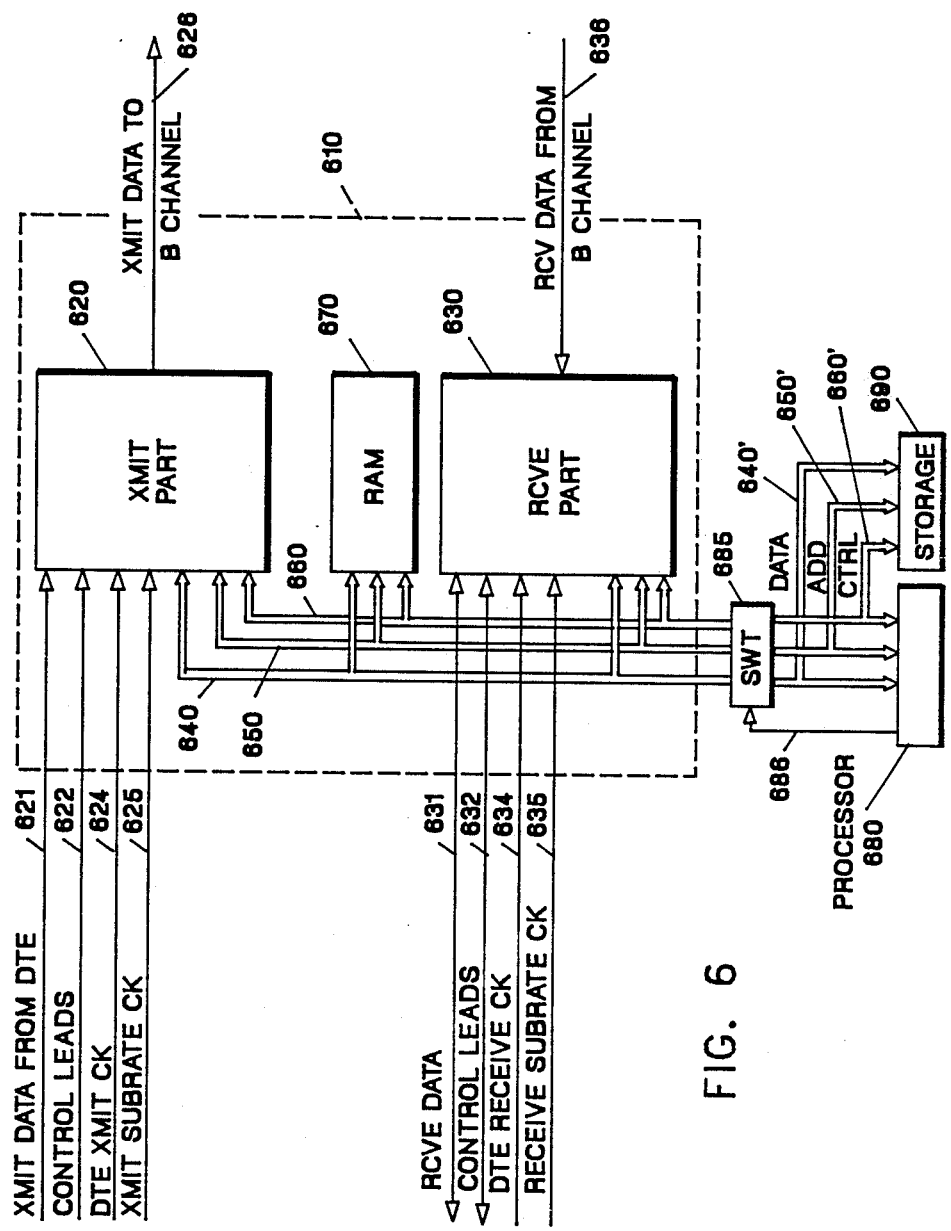
FIG. 6 shows the general architecture of a bit rate adaptation device according to the invention.

FIG. 6 shows the general architecture of a bit rate adaptation device according to the invention, which performs a bit repetition and frame addition function either to fill the intermediate data channel of 8, 16 or 32 kbit/s, if necessary, or to adapt in one step a 48 kbit/s or 56 kbit/s stream to the 64 kbit/s B-channel rate according to FIG. 5f and FIG. 5g.

As seen in the figure, a bit rate adaptation device 610 includes a transmit part 620 involved in the transmission of data from the Data Terminal Equipment DTE (TE2) to the digital network, and a receive part 630 involved in the transmission of data in the other way. Transmit part 620 receives data from DTE over lead 621 and control information on control leads 622. As will be described below, control leads 622 carries signals coming either from the Data Terminating Equipment DTE (for instance with respect to the V. 24 Rec. : the signals "Ready to send", "Data terminal ready" . . . ), or from processor 680. Two clock signals, "DTE transmit clock" on lead 624 and "sub-rate transmit clock" on lead 625 described in details hereinafter, drive transmit part 620 of the bit rate adaptation device of the invention.

Similarly, Receive part 630 gets data coming from the B-channel at 64 kbit/s on lead 636 and after processing in order to perform the reverse rate adaptation with respect to that of the above transmit part 620, transmits the data on "received data" lead 631. Control information is also transmitted either to the Data Terminating equipment DTE or to processor 680 via control leads 632. As previously, receive part 630 is also driven by clocks coming from "DTE receive clock" lead 634 and "receivesub-rate clock" lead 635.

Transmit and receive parts 620 and 630 are connected via a data bus 640, an address bus 650 and a control bus 660, via a switch (SWT) 685 and via a data bus 640', an address bus 650', and control bus 660' to an external processor 680. Switch 685 is controlled by processor 680 by means of a lead 686. The presence of switch 685 allows the three busses 640, 650 and 660 of the bit rate adapter 610 to be disconnected from the three busses 640', 650' and 660' of processor 680. Processor 680 may also address a storage 690 by means of busses 640', 650' and 660'. The bit rate adaptation device according to the invention also includes a storage such as a Random Access Memory 670 which is connected to data bus 640, address bus 650 and control bus 660. RAM storage 670 may be addressed either by processor 680 via the three busses 640'/650'/660', switch 685, and the three busses 640/650/660 or by transmit part 620 or receive part 630 directly via busses 640, 650 and 660. The bit rate adaptation device of the invention becomes operational at the end of an initialization period, during which switch 685 is put ON so that processor 680 may load the content of RAM 670 with data extracted from storage 690. In the particular embodiment of the invention detailed hereinafter, RAM 670 can store 40 5-bits words. The content of RAM 690 is representative of a particular frame structure described above with respect to FIG. 3, and can easily be updated as soon as the digital communication involves an other frame structure. Since a given rate adaptation involves an unique frame structure for both transmission and reception parts 620 and 630, a single RAM can be used for both parts, what entails numerous advantages: less memory cells needed for RAM 670, an unique initialization period, the assurance that both transmit and receive parts 620 and 630 are controlled by the same 40 5-bits words program, no use of complex and sophisticated Direct Memory Access mechanism.

The general principle of the transmission of data coming from the Data Terminating equipment DTE is as in the following: a stream of data D1-D2.D3-D4-... having a rate lower than 64 kbit/s is transmitted from the DTE via lead 621 to transmit part 620 which stores them into a buffer not shown. At the same time, transmit part 620 continuously generates addresses on bus 650, the addresses being incremented at the rate of transmit sub-rate clock on lead 625, in order to continuously extract each one of the 40 5-bits words stored into RAM 670. The successive appearances of one of the 40 5-bits words on data bus 640 will allow the control of transmit part 620 as will be described with details hereinafter, so that the right binary information (such as a Data bit, a S bit or a E-bit ...) will appear at the output on lead 626, accordingly with FIG. 3, FIG. 5a, 5b, 5c, 5d, 5e, 5f and 5g and timings of FIG. 4.

The transmission of data coming from the B-channel and to the Data Terminating equipment DTE is achieved as in the following: the received data coming from the B-channel are received by receive part 630 on lead 636. Receive part 630 continuously generates addresses on bus 650, at the rate of the receive sub-rate clock on lead 635 (8, or 16 or 32 kHz for data stream rates below 48 kbit/s) in order to continuously extract each one of the 40 5-bits words stored into RAM 670. The successive appearances of a 5-bits word on data bus 640 will allow the control of receive part 630 as will be described with details hereinafter and eventually the adaptation of the rate of the B-channel stream of data coming from lead 636, and transmitted to the DTE via lead 631. Receive sub-rate clock on lead 635 and transmit sub-rate clock on lead 625 are two clocks having their phase being in opposition so that RAM storage 670 may be addressed successively by transmit part 620, then by receive part 630.

Figure 7:
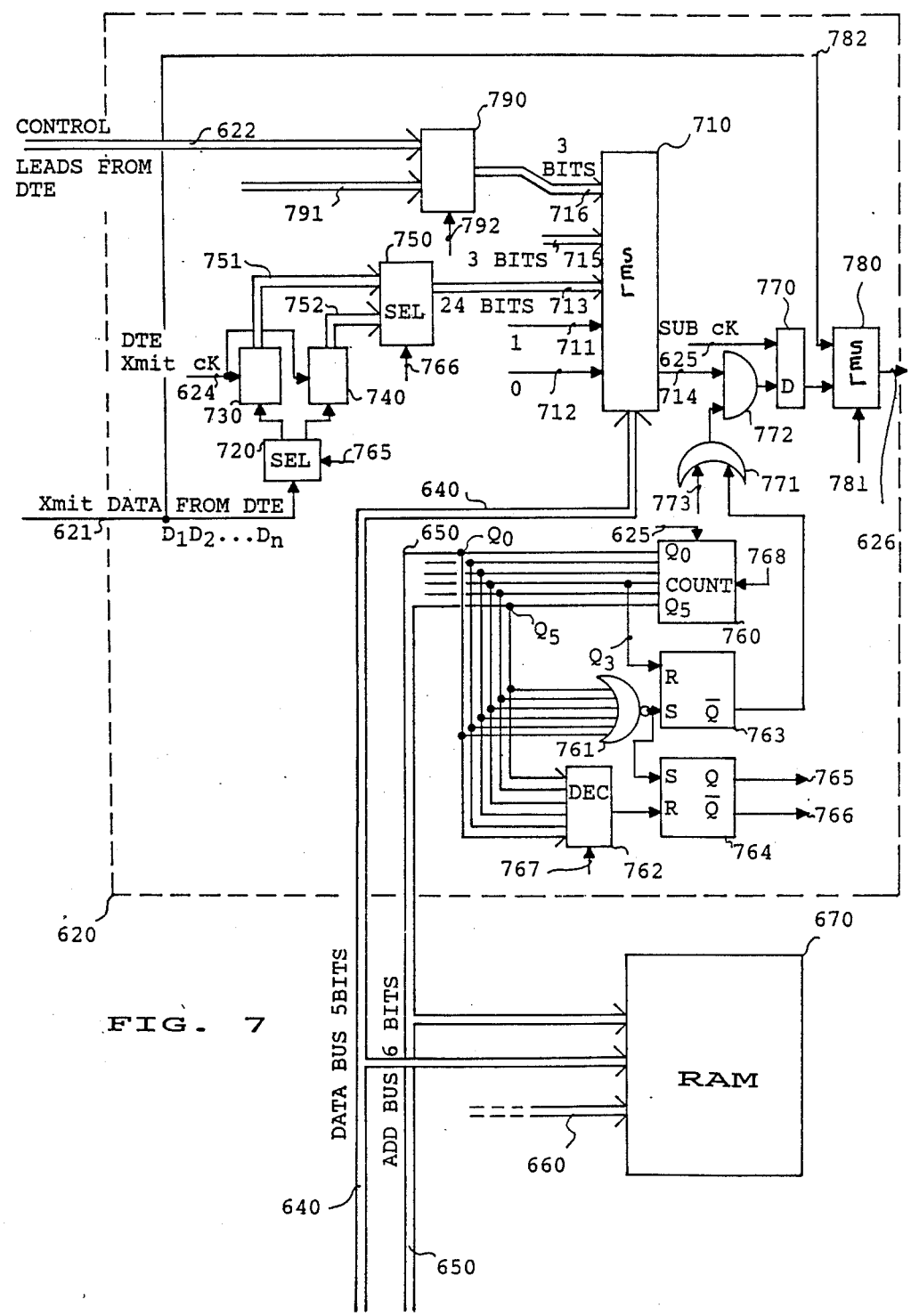
FIG. 7 is a detailed view of the transmit part 620 of the bit rate adaptation device according to the invention.

FIG. 7 is a detailed view of the transmit part 620 of the bit rate adaptation device according to the invention. Transmit part 620 includes a selector 710 allowing the transmission of one signal among 32 input signals (25) to an output lead 714 according to the content of 5-bits data bus 640. The 32 input signals are those existing on leads 711, 712, on a 3-bits-bus 715, on a 3-bits-bus 716 and on a 24-bits-bus 713. A counter 760 is driven by the pulses coming from "sub-rate transmit clock" lead 625 and controlled by leads 768 so that to be reset either every 80 pulses (if the stream on lead 621 (FIG. 6) has a rate less than 48 kbit/s) or every 64 pulses (if the stream on lead 621 has a rate of 48 kbit/s) or at last, every 32 pulses (if the stream on lead 621 has a rate of 56 kbit/s). Counter 760 is connected to 6-bits address bus 650 (Q0-Q1-Q2-Q3-Q4-Q5) which is connected to RAM 670 as mentioned previously. Address bus 650 is connected to a 6-bits NOR gate 761 and to a decode circuit 762 for decoding either the decimal value '40° (for a stream having a rate less than 48 kbit/s), or the decimal value '32° (rate of 48 kbit/s) or the decimal value '16' (data stream from DTE having a rate of 56 kbit/s). The choice of the right decimal value is controlled by processor 680 by means of leads 767. The output of decode circuit 762 is connected to the "reset input" of a latch 764. The output of NOR gate 761 is connected to the "set" input of a latch 763 and to the "set input" of latch 764. Q3 bit extracted from address bus 650 is connected to the "reset" input of latch 763 in order to reset the latter as soon as the output of counter 760 reaches the value '8' (in decimal) as will be described hereinafter. The complement output of latch 763 is connected to a first input of an OR gate 771 having its second input connected to a "48/56k" lead 773 allowing the inhibition of the mechanism based on latch 763 and NOR gate 761 when a 48 kbit/s or 56 kbit/s DTE communication stream is involved. The output of OR gate 771 is connected to a first input of an AND gate 772 having its second input connected to the output lead 714 of selector 710. The output of AND gate 772 is connected to the D-input of a D-latch 770 driven by the sub-rate clock existing on "sub-rate transmit clock" 625. The output of D-latch 770 is connected to a first input of a selector 780 controlled by processor 680 via a lead 781 and having a second input connected to "transmit data from DTE" lead 621 carrying the sequence of data bits coming from the DTE. Therefore, processor 680 can transmit directly data from lead 621 to the output 626 of selector 780 when no rate adaptation is necessary (when the Data Terminating Equipment transmits directly at 64 kbit/s). "transmit data from DTE" lead 621 is also connected to the input of a selector 720 controlled by the true output of latch 764 on lead 765. Selector 720 has a first and second output respectively connected to a first and second shift register 730 and 740, each shift register being driven by "DTE transmit clock" from lead 624. In the preferred embodiment of the invention, shift registers 730 and 740 are 24-bits registers having respectively a 24-bits bus 751 and 752 connected to a selector 750 controlled by the complement output of latch 764 on lead 766. The output of selector 750 is 24 bits-bus 713 which eventually form 24 among the 32 input signals, as mentioned above, of selector 710. In addition to the 24 signals provided by bus 713 and to the two signals provided by leads 711 and 712, busses 715 and 716 provide the last 6 signals eventually forming, with the other signals already mentioned, the 32 input signals of selector 710, one of which is likely to be transmitted to output lead 714 at each pulse of "sub-rate transmit" clock on lead 625 and according to the content of data bus 640. Bus 716 is a 3-bits output of a selector 790 having a first input connected to a bus 791 carrying data coming from processor 680, and particularly the S1/S3, S4 and X bits. Selector 790 has also a second input connected to control leads 622 coming from the DTE and carrying signals RTS (Ready to send), DTR (data terminal ready).... Selector 790 is controlled by processor 680 over a lead 792.

Bus 715 is a 3-bits bus carrying information coming from processor 680, and generally the E-bits. In a preferred embodiment of the invention bus 715 carries the Network independent clock information characterized by the E4, E5 and E6 bits. Since the other E-bits (bit repetition identification E1, E2, E3; multiframe synchronization E7) are not likely to continuously vary during a given communication, they can easily be generated into the frame structure by transmitting the right value, either "ONE" coming from lead 711, or "ZERO" coming from lead 712, at the right moment by means of the right 5-bit words generated by RAM 670. In other words, the existence of those bits can be taken into account by means of RAM 670.

The framing function allowing the transmission of each bit of the 80-bit frame is achieved as in the following:

If the stream of Databits is a 64 kbits/s stream, no rate adaptation processing is needed and therefore, processor 680 makes the latter stream be transmitted directly to the output of the transmit part 620 on lead 626 by means of control lead 781.

If the stream of data bits coming from the Data Terminal Equipment has a rate below 48 kbit/s (e.g. the rate adaptation is according to any one of FIG. 5a to FIG. 5e), the transmit part of the rate adaptation is achieved as in the following:

The stream of data bits is conveyed by means of lead 621 at the rate of the "DTE transmit" clock. It should be noticed that "DTE transmit" clock on lead 624 and "transmit sub-rate" clock on lead 625 (as well as "DTE receive" clock and "receive sub-rate" clock involved in the receive part 630) are derived from a same master clock, currently a quartz oscillator having a frequency at least equal to 8.064 Mhz in order to provide any needed clocks necessary for the handling of all currently marketed DTE. For illustrating purpose, it will be assumed that "DTE transmit" clock is 19,200 Hz and the "transmit sub-rate" clock on lead 625 has a rate of 32,000 Hz, so that the frame structure will be according to that of FIG. 5E. Since "sub-rate transmit clock" (in our example a 32 kHz clock) and "DTE transmit clock" (a 9,600 Hz clock) are derived from the same master clock, every transition of one clock occurs, should the occasion arise, at a transition of the other. In our typical case, the occurrence of every 24 pulses of 19,600 Hz "DTE transmit" clock coincides with the occurrence of every 40 pulses of 32 kHz "sub-rate transmit clock". The stream of Data bits is conveyed to the input of selector 720 which transmits each bit to a shift register, for instance shift register 730. Because of the above relationship between "DTE transmit" clock which drives the sequential loading of the stream of Data bits into the shift registers, and "sub-rate transmit clock" on lead 625 which drives counter 760, the latter counter progresses from address '00' to address '39' while 24 Data bits are stored in one shift register. When counter 760 starts counting from '00' value (000000 in binary), latch 764, (and latch 763) has been set to "ON" because of NOR gate 761 decoding decimal value '00'. Therefore, selector 720, controlled by the true output of latch 764 on lead 765, conveys the stream of Data bits into shift register 730. As soon as 24 Data bits (D1D2D3... D24) have been stored into shift register 730, counter 760 reaches decimal value '40' which is decoded by decode circuit 762, which resets latch 764. At this time, selector 720 is switched in order to convey the next Data bits into shift register 740. When 24 next Data bits are stored into shift register 740, counter has progressed from state '40'0 (in decimal) to state '80' and then back to state '00'. Latch 764 is then reset back, what entails the loading of the next 24 Data bits into shift register 730. Thus, the Data bits stream is divided into groups of 24 bits and each group is stored in one of the two shift registers. Similarly, selector 750, also controlled by latch 764 via lead 766, allows the transmission of a group of 24 Data bits loaded into one shift register to bus 713, while the loading of next group of 24 Data bits into the second shift register. Thus, when counter 760 progresses from state '00' to state '39', selector 720 loads the group D1D2 ... D24 into shift register 730, while selector 750 transmits the content of shift register 740 which contains the preceding group of Data bits. Conversely, when counter 760 progresses from state '40' to state '79', selector 720 loads the group D25D26 ... D48 into shift register 740, while selector 750 transmits the content of shift register 730 which contains the group D1D2 ... D24 before. As counter 760 generates different values starting from '00' and up to '79' at the rate of "sub-rate transmit clock", RAM storage 670 generates 5-bits words on 5-bits data bus 640 connected to selector 710. The content of one 5-bits word will allow selector 710 to transmit to output lead 714, the content of one among 32 (32=25) input signals chosen among leads 711, 712, 3-bit bus 715, 3-bit bus 716 and 24-bits bus 713. In this way, while counter 760 progresses from state '39' to state '79' and the group D25D26 ... D48 is being loaded into shift register 740, selector 710 transmits to output lead 714, either a binary "ONE" (lead 711) or a binary "ZERO" (lead 712) or one among the 24 Databits D1 ... D24 (bus 713) or one among the 3 control bits coming from bus 716 (S1/S3, S4, X coming from processor 680 or control data coming from the DTE), or, at last, one among the three control bits coming from bus 715 and carrying the E-bits. The choice of one among the 32 possible values is made in accordance with the content of the 5-bits words generated by RAM storage 670 and corresponding to the particular address generated by counter 760. The final frame structure that will characterize the bit rate adaptation is therefore strictly dependent on the content of the RAM storage and which can be easily updated by means of an initialization period as mentioned above.

The presence of latch 763 allows the generation of eight "zero" at each beginning of a 80 steps sequence of counter 760 and characterizing a rate adaptation of a stream having a rate below 48 kbit/s. Latch 763 is set during the eight first steps of each 80 steps sequence of counter 760. This is achieved by means of NOR gate 761 decoding the occurrence of state '00' and by means of Q3 lead extracted from address bus 650 decoding the state '08' and connected to the reset input of latch 763. Therefore, as soon as counter 760 starts at '00' and until it reaches the value '08', latch 763 maintains a low level on the first input of OR gate 771. The second input of OR gate 771 connected to lead 773, is set at a low level since the "DTE transmission" clock has a rate inferior to 48 kHz. Thus, OR gate 771 eventually blocks AND gate 772, which allows the transmission of the eight first "Zero" of the beginning of a frame structure according to FIG. 3. This mechanism based upon latch 763, NOR gate 761 and lead Q3, and combined with the use of two distinctive shift registers 730 and 740 allows the use of a single 40 5-bits words RAM for a whole 80 bits frame structure. Thus, this feature takes advantage of the symmetry of a frame structure of FIG. 3 to substantially decrease the size of RAM 670. Considering now the resources taken by a storage in terms of hardware components, and the fact that the I.S.D.N. terminal adapter is designed to be manufactured in large quantities and intended for general public, the reduction of electronic hardware components takes an emphasized interest.

If the stream of data bits coming the Data Terminal Equipment has a rate of 48 kbit/s (e.g. the rate adaptation is according to that of FIG. 5f), the above generation of 8 zeros at the beginning of every frame structure does not operate since OR gate 771 remains at a high level; which allows the transmission of the output of selector 710 to D-latch 770. In this case, the stream of data bits is divided into groups of 24 bits D1D2 ... D24 according to FIG. 5f, and each group is stored in one of the two shift registers. Counter 760 is controlled by processor 680 via leads 768, in order to be reset every 64 pulses of "transmission sub-rate" clock and similarly decode circuit 762 is switched by means of lead 767 also controlled by processor 680, in order to decode decimal value '32' over bus 650. Therefore, the 48 kbit/s to 64 kbit/s rate adaptation is performed by the successive loading of each group of 24 data bits every 32 pulses of "sub-rate transmit" clock into one of the two shift registers and by the control of selector 710 by means of RAM 670, the output 714 of the latter selector being always transmitted to the output of transmit part 626 since OR gate 771 is permanently stuck to a high level when in 48 kbit/s.

If the stream of data bits coming from the Data Terminal Equipment has a rate of 56 kbit/s (e.g. the rate adaptation is according to that of FIG. 5g), the above generation of 8 zeros at the beginning of every frame structure again does not operate since OR gate 771 remains at a high level; which continuously allows the transmission of the output of selector 710 to D-latch 770. In a preferred embodiment of the invention, the stream of data bits is then divided into groups of 14 bits D1D2 . . . D14, then D15D16 . . . D28, then D29 . . . D42 and then D43 . . . D56, and each group of 14 bits is stored in one of the two shift registers which are consequently loaded with only 14 bits. Counter 760 is controlled by means of processor 680 via leads 768 in order to be reset every 32 pulses of "transmission sub-rate" clock and similarly decode circuit 762 is switched by means of lead 767 also controlled by processor 680, in order to decode decimal value '16' over bus 650. Therefore, the 56 kbit/s to 64 kbit/s rate adaptation is performed by the successive loading of each group of 14 data bits every 16 pulses of "sub-rate transmit" clock on lead 625 into one of the two shift registers and by the control of selector 710 by means of RAM 670 as previously, the output 714 of the latter selector being always transmitted to the output of transmit part 626 since OR gate 771 is permanently stuck to a high level in this case.

As mentioned previously, the sharing of RAM 670 brings some substantial advantages: an unique storage loaded with an unique 40 5-bits program for both transmit and receive parts entailing a save in the final number of components, an unique operation of initialization at the beginning of the transmission . . . . Moreover, the rate adaptation of the invention is particularly adapted to handle high speed data since the control of selector 710 is achieved with a fast access but low cost 40 5-bits RAM 670. For instance, the use of a RAM having a access time of about 100 nanoseconds could provide a 5 Mbps data stream on a B-channel.

Figure 8:
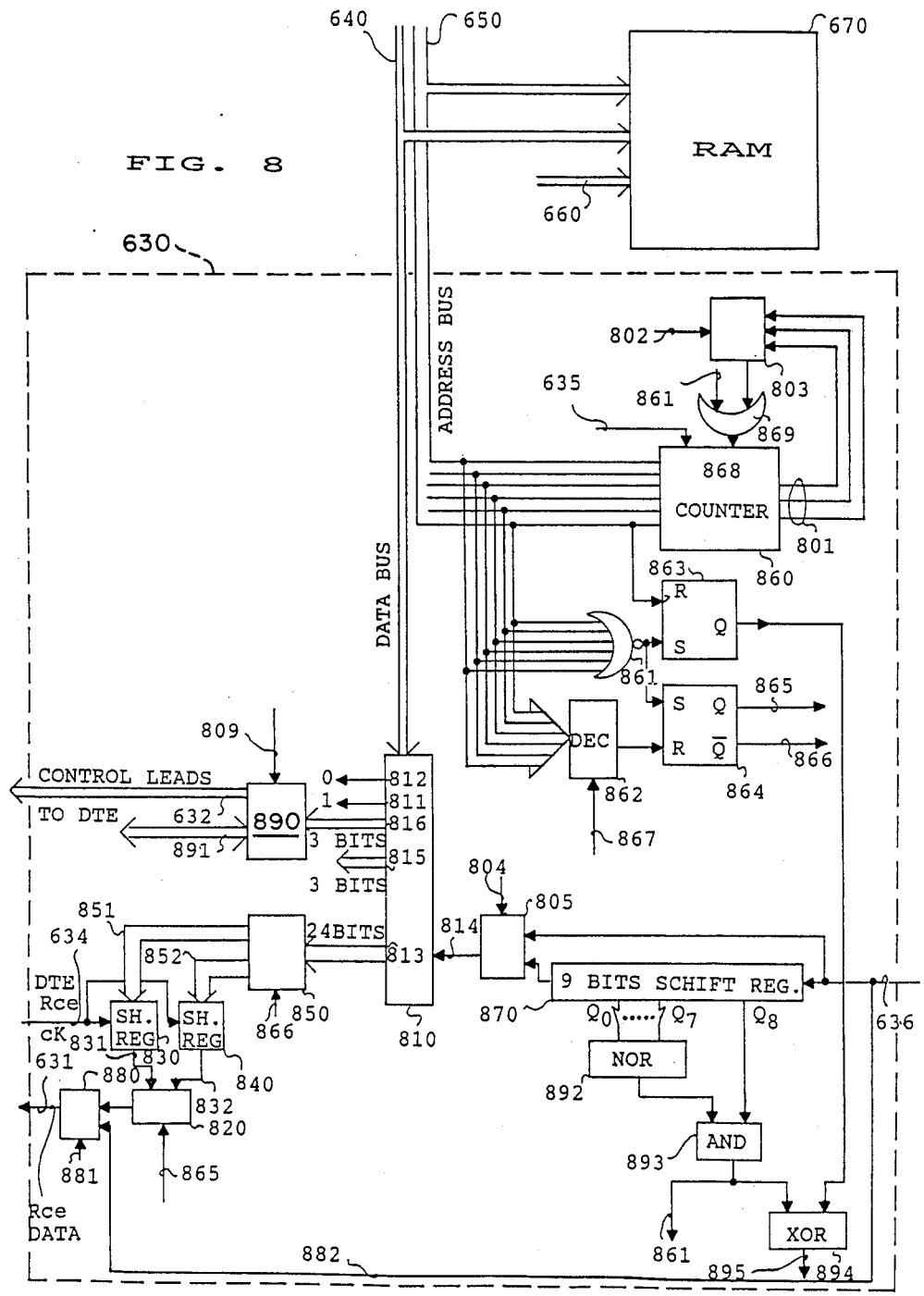
FIG. 8 is a detailed view of the receive part 630 of the bit rate adaptation device according to the invention.

FIG. 8 is a detailed view of the receive part 630 of the bit rate adaptation device according to the invention. Receive part 630 includes a selector 810 allowing the transmission of the signal from a lead 814 to 32 possible outputs (25) according to the content of 5-bits data bus 640. The 32 output leads are leads 811, 812, a 3-bits-bus 815, a 3-bits-bus 816 and a 24-bits-bus 813. A counter 860 is driven by the pulses coming from "sub-rate receive" clock lead 635 and reset by lead 868. Lead 868 is connected to the output of an OR gate 869 having a first input connected to a lead 861 connected to the output of a AND gate 893, and a second input connected to the output of a selector 803. Selector 803 is connected to a bus 801 of three leads coming from counter 860. Whenever the output of counter 860 on address bus 650 reaches the value '80' (resp.'64')(respectively '32'), the first lead (respect. second lead) (respect. third lead) of bus 801 transmits a pulse which is conveyed to one input of selector 803. According to the value carried by leads 802, selector 803 transmits the signal coming either from the first, or the second, or the third lead of bus 801. The signal coming from the selected lead of bus 801 is thus transmitted to the second input of OR gate 869. If the rate of the DTE data stream has a value less than 48 kbits/s, selector 803 will transmit a reset pulse to counter 860 via OR gate 869 every 80 pulses of the "sub-rate receive" clock. On the other hand, if the rate of the DTE stream has a value of 48 kbits/s, selector 803 will transmit a reset pulse to counter 860 via OR gate 869 every 64 pulses of the "sub-rate receive" clock on lead 635. At last, if the rate of the DTE stream has a value of 56 kbits/s, selector 803 will transmit a reset pulse to counter 860 via OR gate 869 every 32 pulses of the "sub-rate receive" clock. Counter 860 is connected to 6-bits address bus 650 (Q0-Q1-Q2-Q3-Q4-Q5) which is connected to RAM 670 as previously. Address bus 650 is connected to a 6-bits NOR gate 861 and to a decode circuit 862 for decoding either the decimal value '40' (for a D TE stream having a rate inferior to 48 kbit/s), or the decimal value '32' (DTE stream having a rate of 48 kbit/s) or the decimal value '16' (data stream from DTE having a rate of 56 kbit/s).

The choice of the right decimal value is controlled by processor 680 by means of leads 867. The output of decode circuit 862 is connected to the "reset input" of a latch 864. The output of NOR gate 861 is connected to the "set" input of a latch 863 and to the "set input" of latch 864. Q3 bit extracted from address bus 650 is connected to the "reset" input of latch 863 in order to reset the latter as soon as the output of counter 860 reaches the value '8' (in decimal) as will be described hereinafter. The complement output of latch 863 is connected to a first input of XOR gate 894 which has its second input connected to the output 861 or an AND gate 893.

Lead 636 carrying the stream of data, the rate of which must be adapted is connected to the input of a 9-bits shift register 870 for storing a sequence of nine bits Q0Q1 . . . Q8. The eight first bits Q0 to Q7 of shift register 870 are conveyed to the input of a 8-bit NOR gate 892, the output of which is connected to a first input of AND gate 893. AND gate 893 receives the content of bit Q0 at its second output and therefore delivers a pulse as soon as the pattern 000000001 characterizing the beginning of one frame is detected (when the DTE data stream has a rate below 48 kbits/s). The output of AND gate 893 is connected to the first input of OR gate 869. The output of shift register 870 is connected to a first input of a selector 805 having its second input directly connected to lead 636. According to level of the signal on lead 804 controlled by processor 680, selector 805 transmits the signal from one input to input lead 814 of selector 810. Therefore, processor 680 can transmit directly data from lead 636 to the input of selector 810 when the stream of data to be transmitted to the Data Terminating Equipment has a value of 48 kbits/s or 56 kbits/s. The outputs of selector 810 are 32 output leads, 24 of them are grouped in a 24 bits-bus 813. The latter 24-bits bus is connected to the input of a selector 850 controlled by a lead 866 carrying the complement output of latch 864. According to the level of lead 866, the content of 24-bits bus 813 may be transmitted either to a bus 851 or a bus 852. Busses 851 and 852 are respectively connected to the input of a first shift register 830 and a second shift register 840. Shift registers 830 and 840 are two 24 bits-shift registers capable of storing the values of data bits D1 . . . D24 in the right place within the shift register and capable of sequentially transmitting their content to respectively a lead 831 or a lead 832 at each pulse of "DTE receive" clock on lead 634. Preferred embodiment of shift registers 830 and 840 are detailed with respect to FIG. 9. The outputs of shift register 830 and 840 are respectively connected to a first and second input of a selector 820 controlled by the true output of latch 864 on lead 865. The output of selector 820 is connected to a first input of a selector 880 having a second input connected to lead 636 and controlled by processor 680 by means of lead 881. Thus, processor 680 is able to transmit directly to the output lead 631 of the rate adapter, either the stream of data coming from selector 820 (when a rate adaptation has been performed) or the stream of 64 kbits/s data stream coming from the B-channel of the I.S.D.N. (when the DTE is able to receive 64 kbits/s data streams).

In addition to the 24 output leads grouped into bus 813, and the two output leads 811 and 812, busses 815 and 816 form the last 6 output leads of the whole set of 32 output leads of selector 810. Bus 716 is a 3-bits bus connected to a selector 890 having a first output connected to a bus 891 for transmitting data to processor 680, and particularly the S1/S3, S4 and X bits. Selector 890 has also a second output connected to control leads 632 for transmitting data to the DTE and particularly signals RTS (Ready to send), DTR (data terminal ready) . . . Selector 890 is controlled by processor 680 by means of a lead 809. Bus 815 is a 3-bits bus carrying information intended for processor 680, and generally the E-bits. In a preferred embodiment of the invention bus 815 carries the Network independent clock information characterized by the E4, E5 and E6 bits.

The rate adaptation of the intermediate data channel signal in order to provide the DTE data rate is achieved as in the following:

If the DTE data stream rate is a 64 kbits/s stream, no rate adaptation processing is needed and therefore, processor 680 makes the intermediate data channel signal on lead 636 be transmitted directly to the output of the receive part 630 on lead 631 by means of selector 880.

If the stream of data bits transmitted to the Data Terminal Equipment has a rate below 48 kbit/s (e.g. the rate adaptation is according to any one of FIG. 5a to FIG. 5e), receive part 630 of the rate adaptation operates as in the following:

The stream of data coming from the B channel at 8, 16 or 32 kbits/s is conveyed to the input of shift register 870, and then to selector 810 through selector 805. Shift register 870 is used in order to decode the pattern "000000001" characterizing the beginning of one frame. As soon as eight successive "ZERO" are received, NOR gate 892 is put at a high level, and AND gate 893 is set to one if the next bit Q8 is a "ONE". The output of AND gate 893, carrying the detection of the beginning of the frame, is used to reset counter 860 through OR gate 869. As mentioned before, counter 860 is also reset as soon as the value appearing on address bus 650 reaches the decimal value '80' by means of a pulse transmitted from the first lead of bus 801 to OR gate 869 through selector 803.

Consequently, counter 860 continuously progresses from the state '00' to the state '79', generating the different addresses on bus 650, entailing the succession of 5-bits words coming from RAM 670 and which eventually allows the control of selector 810. When counter 860 starts counting from the value '00' latches 863, and 864 are set to "ON" because of NOR gate 869. Selector 850, controlled by the complement output of latch 864, is therefore switched in order to convey the data coming from the 24-bits bus 813 into shift register 840. Conversely, selector 820, controlled by the true output of latch 865 is switched in order to receive the content of shift register 830 and to transmit it to selector 880. Similarly than above, when 24 data bits D1D2D3 . . . D24 have been stored into shift register 840, counter 860 reaches decimal value '40' which is decoded by decode circuit 862, which resets latch 864. At this time, selector 850 is switched in order to convey the next Data bits into shift register 830. When 24 next Data bits are stored into shift register 830, counter has progressed from state '40' (in decimal) to state '80' and then back to state '00'. Latch 864 is then reset back, what entails the loading of the next 24 Data bits into shift register 840, in a similar way as with respect to the transmit part 620. The continuous control of selector 810 by means of the succession of 5-bits words appearing on data bus 640 allows each bit carried by lead 814 to be transmitted either to the 24-bits bus 813, or to lead 812 which should always receive the constant "ZERO" bits of the frame structure according to FIG. 3, or to lead 811 which should always get a "ONE" bit. In a preferred embodiment of the invention, leads 811 and 812 are connected to a detection device for detecting the occurrence of erroneous "ONE" bits on lead 812, and erroneous "ZERO" bit on lead 811. According to the 5-bits word on data 640, selector 810 may also transmit the content of the bit carried on lead 814 to control bus 815 carrying the E-bits, or to a lead of bus 816 either to processor 680 (S1/S3, S4, X bits) via bus 891 or to the DTE via control leads 632. Latch 863 is set during the eight first steps of each 80 steps sequence of counter 860. This is achieved by means of NOR gate 861 decoding the occurrence of state '00' and by means of Q3 lead extracted from address bus 650 decoding the state '08' and connected to the reset input of latch 863. Therefore, as soon as counter 860 starts at '00' and until it reaches the value '08', latch 863 maintains a low level on the first input of XOR gate 894. The second input of XOR gate 894 connected to lead 861, is set at a low level as long as the synchro pattern '000000001' does not appear on lead 636. Consequently, XOR gate 894 switches to a level high whenever the synchro pattern is detected and counter 860 is not reset, or conversely, when counter 860 is reset and the synchro pattern is not appearing. A signal of "loss of frame synchronization" appearing on lead 895 can be transmitted to processor 680 or other error management means.

If the stream of data bits to be transmitted to the DTE has a rate of 48 kbit/s (e.g. the rate adaptation is according to that of FIG. 5f), the above detection of the frame synchro pattern does not operate since data coming from lead 636 is transmitted directly to input lead 814 of selector 810 by means of selector 805 controlled by processor 680. At 48 kbit/s, the frame alignment is performed by checking the incoming bits forced to one and zero. If an error is formed, the receive counter is reset, and the system will wait during one frame if an error is detected. This process will converge so that the synchronization is achieved after some retries. There is no frame synchronization at 56 kbit/s due to the table structure. Only a byte synchro exists which is performed by the digital network itself. As for the transmit part of the rate adaptation, the stream of data bits is still divided into groups of 24 bits D1D2 . . . D24 according to FIG. 5f, and each group is stored in one of the two shift registers. Selector 03, controlled by processor 680 via leads 802, makes counter 860 be reset every 64 pulses of "sub-rate receive" clock and similarly decode circuit 862 is switched by means of lead 867 also controlled by processor 680, in order to decode decimal value '32' over bus 650. Therefore, the 64 kbit/s to 48 kbit/s rate adaptation is performed by the successive loading of each group of 24 data bits every 32 pulses of "sub-rate receive" clock into one of the two shift registers.

If the stream of data bits to be transmitted to the Data Terminal Equipment has a rate of 56 kbit/s (e.g. the rate adaptation is according to that of FIG. 5g), the above detection of the frame synchro pattern achieved by means of shift register 870, NOR gate 892 and AND gate 893 does not operate since the data directly bypass shift register 870 by means of selector 805 controlled by lead 804. Each group of 14 data bits, such as D1D2 ... D14, D15D16 ... D28 ... is stored in one of the two shift registers. Selector 803 is controlled by means of processor 680 via leads 802 in order to transmit the reset signal from the third lead of bus 801 to the input of OR gate 869, i.e. a reset signal every 32 pulses of "sub-rate receive" clock and similarly decode circuit 862 is switched by means of lead 867 also controlled by processor 680, in order to decode decimal value '16' over bus 650. Therefore, the 64 kbit/s to 56 kbit/s rate adaptation is performed according to FIG. 5g by the successive loading of each group of 14 data bits every 16 pulses of "sub-rate receive" clock on lead 625 into one of the two shift registers.

Figure 9:
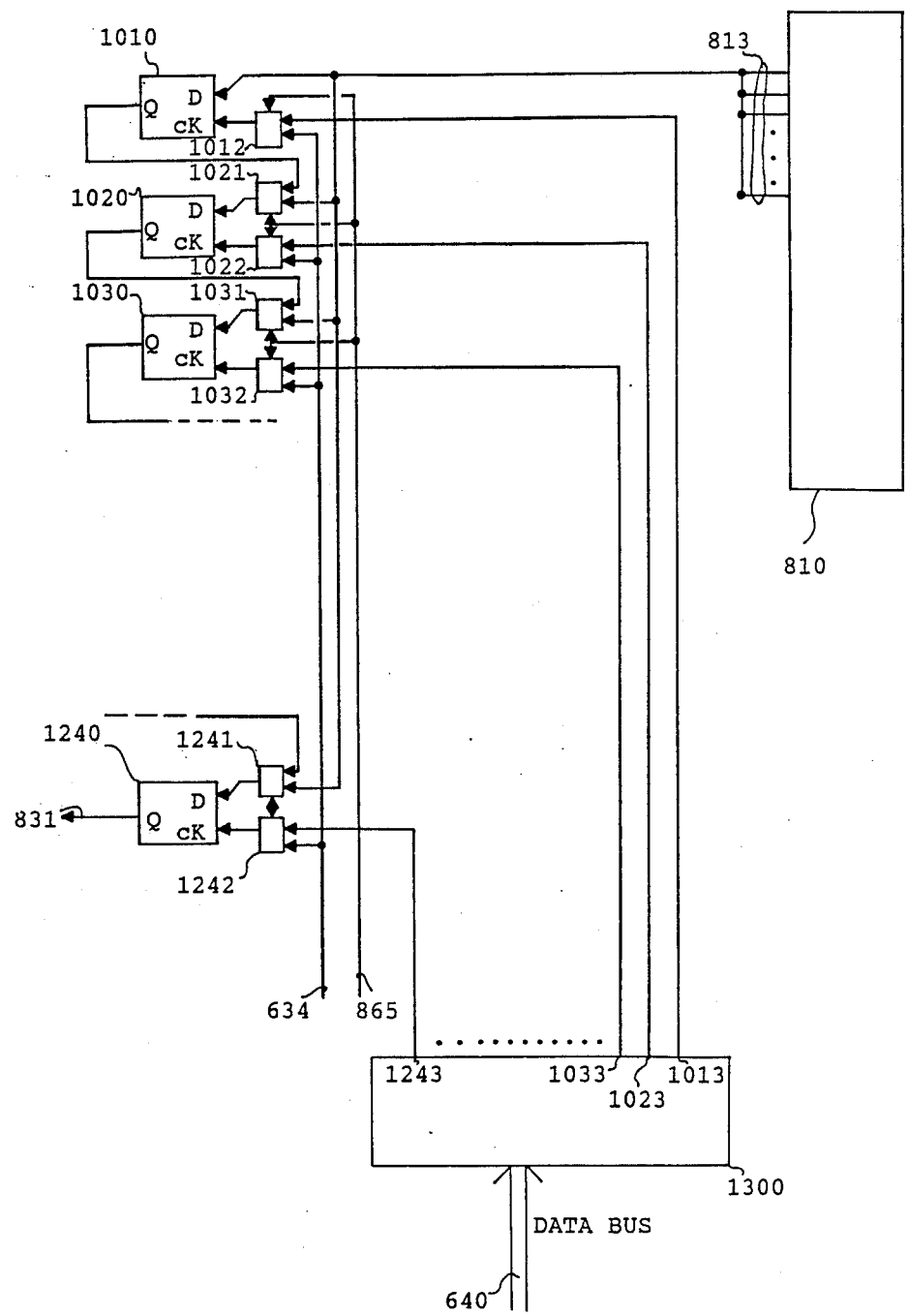
FIG. 9 is a view of a possible embodiment of the two shift registers and selector 750.

FIG. 9 is a view of a preferred embodiment of one of the two shift registers, for instance shift register 830, of the rate adaptation device of the invention. Shift register 830 includes a set of 24 D-latches 1010, 1020, 1030 . . . 1240 hereinafter referenced 1XX0 with XX varying from 01 to 24. For instance, latch 1XX0 with XX=02 corresponds to latch 1020. In the figure, only latches 1010, 1020, 1030 and 1240 are illustrated. Each latch 1XX0 (with XX=02 to 24), i.e. excepted latch 1010, has its D-input connected to the output of a selector 1XX1. Each selector 1XX1 driving a given latch 1XX0 (XX=02 to 24) has a first input connected to the true output Q of the latch preceding latch 1XX0. For instance, selector 1031 driving latch 1030 has a first input connected to the true output Q of latch 1020. The 24 output leads of bus 813 of selector 810 are connected together and also connected to the D-input of latch 1010 and to the second input of each selector 1XX1 (with XX=02 . . . 24). Each latch 1XX0 has its clock input CK connected to the output of a second selector 1XX2 which has a first input connected to lead 634 carrying the "DTE receive" clock. Every second selector 1XX2 (with XX=01 to 24) has a second input which is connected to a an output lead 1XX3 (XX=01 to 24) of a decoder 1300 controlled by data bus 640. All selectors 1XX1 (with XX=02 to 24) and 1XX2 (with XX=01 to 24) are controlled by lead 865 carrying the true output of latch 864 with respect to FIG. 8. The Q output of latch 1240 is connected to lead 831 which will transmit the stream of data bits to selector 820. Shift register 840 is implemented in a similar way. However, it should be noticed that the control leads of every selectors of shift register 840 are connected to the complement output of latch 864, so that shift register 830 may be loaded with data bits while the other shift register unloads its content to selector 820.

Every shift register 830 or 840 operates as in the following:

When counter 860 starts counting from the value '00' latch 864 is set to "ON" and lead 865 is set to a high level. Consequently selectors 1XX1 (with XX=02 to 24) and 1XX2 (with XX=01 to 24) are switched so that the CK input of every latch receives the "DTE receive" clock pulses and the D-input of latch 1XX0 (with XX=02 to 24) receives the value of the Q output of the preceding latch. Thus, the content of the whole shift register 830 appears sequentially on lead 831 at each pulses of "DTE receive" clock on lead 634.

When counter 860 reaches the value '40' (for a DTE rate below 48 kbits/s), latch 864 of FIG. 8 is reset and lead 865 is set to a low level. Consequently selectors 1XX1 (with XX=02 to 24) and 1XX2 (with XX=01 to 24) are switched so that the CK input of every latch receives the value carried by the corresponding output lead of decoder 1300, and the D-input of latch 1XX0 (with XX=02 to 24) receives the value of the data bit appearing at any output of the 24-bits bus 813 of selector 810. When data bus 640 carries a 5-bits word corresponding to a particular data bit to be loaded, e.g. data bit D3, decode circuit 1300 transmits a high level on lead 1033 which entails the loading of D3 into the third latch of shift register 830, i.e. latch 1030. In this way, the whole succession of the 24 (or 14 when a DTE stream of 56 kbits/s is involved) data bits are loaded directly into shift register 830.

The invention has been particularly described with respect to basic user interfaces I.430 which are the most common interfaces that will be developed in the near future. However, it should be noticed that this invention can also be used for primary rate user network interfaces (cf. Rec. I.431), or for a TEI data terminal equipment as well as for a terminal adapter designed to be connected to a TE2 data terminal equipment.

We claim:

1. A rate adaptation system for adapting the rate of a communication stream between a first communication device (TE) and a second communication device (NT), said first communication device transmitting and receiving data at a first given rate, said second communication device transmitting and receiving data at a second rate higher than said first rate, said rate adaptation system including a transmit part (620) for allowing the transmission from said first communication device to said second communication device by means of a bit repetition and/or framing function, said rate adaptation system including a receive part (630) for allowing the transmission of said second communication device to said first communication device, characterized in that:

said rate adaptation system includes a processor (680) external to said transmit part (620) and said receive part (630), and a first storage (670) which can be addressed by an address bus (640), a data bus (650) and a control bus (660) either by said transmit part (620), or said receive part (630) or by said processor (680), said rate adaptation system includes a second storage (690) which can be addressed by said processor (680), a part of the content of said second storage (690) being loaded into said first storage (670) during an initialization period by means of said processor (680), said part of the content of said second storage (690) being representative of a particular frame structure corresponding to a given bit repetition and frame function, said initialization period taking place before the beginning of the communication between said first and said second communication devices, said rate adaptation system includes means (760) operating after said initialization period for generating a first sequence of values on said address bus (650) for extracting from said first storage (670) a first sequence of values on said data bus (640), and further including means (710) responsive to said first sequence on said data bus (640) to condition said transmit part (620) to perform said bit repetition and framing functions, said rate adaptation system includes means (860) operating after said initialization period for generating a second sequence of values on said address bus (650), said second and said first sequence of values being interleaved so that an occurrence of a value on address bus (650) of said first sequence occurs at a different instant that any occurrence of a value of said second sequence, for extracting from said first storage (670) a second sequence of values on said data bus (640), and further including means (810) responsive to said second sequence on said data bus (640) to condition said receive part (620) to perform the reverse operation relative to said bit and framing functions.

2. A rate adaptation device according to claim 1 and characterized in that:

said transmit part (620) includes a first selector (710) for transmitting the signal from one among N input leads to an output lead (714), said first selector (710) being controlled by said first sequence of values on said data bus (650) extracted from said first storage (670), said N input leads to said first selector (710) carrying either data bits coming at said first rate from said first communicating device, or control bits, or a binary "ONE" (711) or a binary "ZERO" (712), said control bits coming either from said processor (680) or said first communicating device, said output of said first selector (710) generating a output sequence of bits at said second rate, the value of each bit of said output sequence being, at a given instant, the value of one among N bit appearing at the input of said first selector (710) and accordingly to the value carried by said data bus (640).

3. A rate adaptation system according to claim 2 and characterized in that:

said transmit part (620) includes a first and second shift register (730, 740), each of said shift registers (730, 740) storing a group of p data bits coming from said first communicating device at said first rate, said transmit part (620) includes means (764) for loading said first shift register (730) with a first group of p data bits coming from said first communicating device at said first rate, while the content of said second shift register (740) is connected to p input leads among said N input leads of said first selector (710), and conversely, for loading said second shift register (740) with a second group of p data bits coming from said first communicating device at said first rate, while the content of said first shift register (730) is connected to p input leads among said N input leads of said first selector (710).

4. A rate adaptation system according to claim 3 and characterized in that: said means (760) for generating a first sequence of values on said address bus (650) includes a counter (760) driven by a clock being in synchronism with said second rate, the outputs of said counter (760) being connected to said address bus (650) in order to sequentially address said first storage (670), said addressing of said first storage (670) by said counter (670) entailing the extraction of a sequence of data on said data bus (640) at said second rate, allowing the continuous selection of one among N bits at the inputs of said first selector (710).

5. A rate adaptation device according to claim 1 and characterized in that:

said receive part (630) includes a second selector (810) for transmitting the signal from an input lead 814 to one among N output leads (811, 812, 813, 815, 816), said second selector (810) being controlled by said second sequence of values on said data bus (650) extracted from said first storage (670), said N output leads of said second selector (810) includes leads carrying either data bits (813) transmitted at said first rate to said first communicating device, or control bits (816), or a "ONE" (811) or a "ZERO" (812), said control bits (816) going either to said processor (680) or to said first communicating device, said input of said second selector (810) receiving an input sequence of bits at said second rate, the value of each bit of said input sequence being, at a given instant, the value of one among N bit appearing at the output of said second selector (810) and accordingly to the value carried by said data bus (640).

6. A rate adaptation system according to claim 5 and characterized in that:

said receive part (630) includes a first and second shift register (830, 840), each of said shift registers (830, 840) storing a group of p data bits intended to be transmitted to said first communicating device at said first rate, said receive part (630) includes means (820, 864, 850) for transmitting the content of said first shift register (830) to said first communication device at said first rate, said content of said first shift register (830)

being a first group of p data bits, while said second shift register (740) is loaded with values coming from p output leads among said N output leads of said second selector (810), and conversely, for loading said first shift register (830) with values coming from said p output leads of said second selector (810) while the content of said second shift register (840) is transmitted to said first communication device at said first rate.

7. A rate adaptation system according to claim 6 and characterized in that:

said means (860) for generating a second sequence of values on said address bus (650) includes a counter (860) driven by a clock being in synchronism with said second rate, the outputs of said counter (860) being connected to said address bus (650) in order to sequentially address said first storage (670), said addressing of said first storage (670) by said counter (670) entailing the extraction of a sequence of data on said data bus (640) at said second rate, allowing the continuous selection of one among N bits at the outputs of said second selector (810).

8. A rate adaptation system according to any one of claim 1 to 7 and characterized in that:
said first communication device is a terminal equipment TE and said second communicating device is a network terminating equipment whereby, said rate adaptation system allows the connection of a wide range of existing terminal equipments having different interfaces to a digital network.

* * * * *